United States Patent
Farnam et al.

[15] 3,655,210
[45] Apr. 11, 1972

[54] HIGH TORQUE RETENTION HEAT INSULATIVE GASKET STRUCTURE

[72] Inventors: Robert G. Farnam, New Libson; Michael T. Passarella, Wisconsin Rapids, both of Wis.

[73] Assignee: F. D. Farnam Co.

[22] Filed: Sept. 29, 1970

[21] Appl. No.: 76,459

Related U.S. Application Data

[63] Continuation-in-part of Ser No. 66,958, Aug. 26, 1970, abandoned.

[52] U.S. Cl. .......................................................277/235 B
[51] Int. Cl. ..........................................................F10j 15/06
[58] Field of Search ..............277/166, 180, 227, 233, 235 B; 161/124, 169, 170

[56] References Cited

UNITED STATES PATENTS

| | | | |
|---|---|---|---|
| 2,116,000 | 5/1938 | Peterson | 277/227 |
| 1,241,587 | 10/1917 | Victor | 277/235 B |
| 854,234 | 5/1907 | Perry | 277/166 |
| 2,681,241 | 6/1954 | Aukers | 277/235 B |
| 2,026,854 | 1/1936 | Victor | 277/235 B |

FOREIGN PATENTS OR APPLICATIONS

| | | | |
|---|---|---|---|
| 282,343 | 4/1966 | Australia | 277/DIG. 6 |

*Primary Examiner*—Robert I. Smith
*Attorney*—Mann, Brown, McWilliams & Bradway

[57] ABSTRACT

A gasket structure permitting the selective variance of components thereof whereby high torque retention, heat insulating and fluid-tight sealing is obtained. The specific disclosure and application of use is in a gasket-heat-insulating assemblage for providing insulating and sealing functions between, for instance, the throttle body and bowl or the throttle body and the manifold of an internal combustion engine carburetor assembly. By increasing the density of the heat insulating member at the bolt hole portions by which the member is retained in the assemblage, as by means of densification or the provision of a suitable insert member, torque retention and the spring effect of the member may be controlled. Additionally, by providing gasket layer components on one or both sides of the insulating member, especially where one is furnished with a sealing band, fluid-tight sealability in the intended field of use is maximized. Methods for forming specific specific constructions are also disclosed.

24 Claims, 11 Drawing Figures

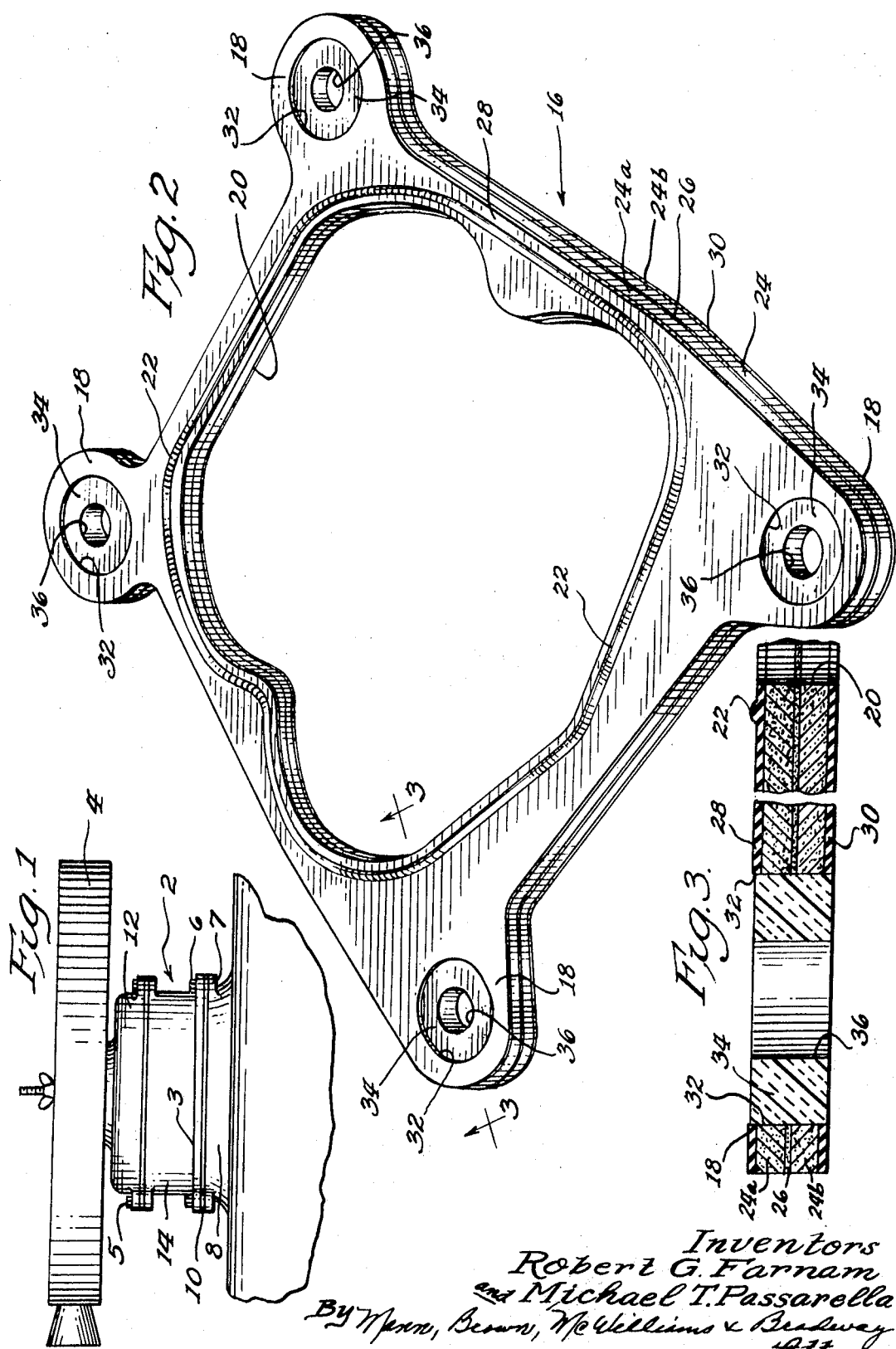

Inventors
Robert G. Farnam
and Michael T. Passarella

Attys.

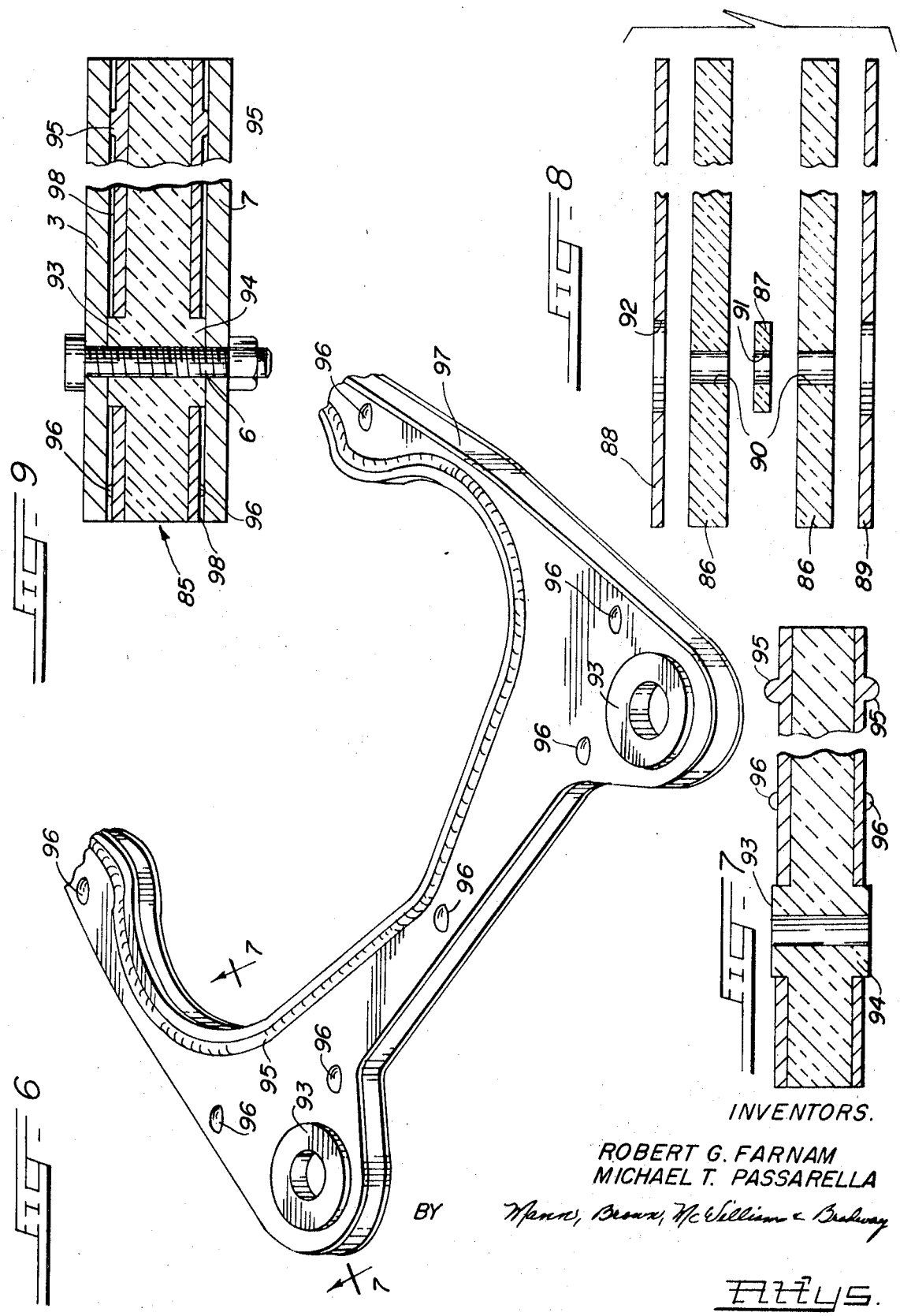

HIGH TORQUE RETENTION HEAT INSULATIVE GASKET STRUCTURE

This application is a continuation-in-part of our application, Ser. No. 66,958 filed Aug. 26, 1970.

BACKGROUND OF THE INVENTION

Today's high-powered and sensitive internal combustion engines have produced unique carburetion problems. Since most modern cars have low silhouettes, insulation under the hood, and restricted air ventilation over the engine, the tendency for temperature build-up in the carburetor is substantially increased, particularly when the engine is turned off after normal car operation. If the heat build-up is enhanced through conduction from the intake manifold to the carburetor, the problem is even greater, and hence the need or adequate gasket insulation from the intake manifold to the carburetor throttle body, and in some cases from the throttle body to the fuel bowl.

Along with the need to insulate the carburetor from engine heat is the need to provide a structure that will also effect sealability between the respective flanged parts in which the insulating structure is used. Thus, where it is desired to use an insulating structure between the throttle body and the intake manifold, due regard must be given to the provision of fluid-tight seals at the juncture surfaces of these components. Along with the insulating and sealability requirements for the above described structure or member, it is necessary to impart to that structure high torque retention characteristics so that, through long periods of usage under service conditions, the components of the carburetor assemblage will remain in fluid-tight relationship or are capable of being put back into such condition even when one component is removed from the other during various periods of servicing. The insulating-sealing structure must also possess the ability to perform these essential functions without creating distortion in mating metal parts between which it is placed, the metal parts usually being soft ductile materials, such as aluminum or zinc. By distortion is meant that, when an insulating-sealing structure is used between opposed flanged members, the bolting of one member to another with the insulating-gasket structure therebetween, bowing, arcing or other uneven mating of the components will result. Many times a structure that is clamped between two others produces a so-called spring effect, tending to distort one or both of the mating surfaces of opposed members. Obviously, distortion is quite undesirable in that it breaks the fluid-tight engagement or seal between opposed mating surfaces, and may also cause actual breakage of the throttle body adjacent to the bolt holes. To meet the aforedescribed criteria and overcome undesirable conditions found in today's automotive environment is the subject matter of this invention.

The prior art has suggested the use of one or more members for effecting thermal insulation, fluid sealing, torque retention and minimization of distortion in the highly sensitive carburetor bowl assembly of an internal combustion engine. However, for the most part, these suggestions have been unable to meet and satisfy all of the requirements necessary to provide insulating and sealing qualities, while maintaining high torque retention. Where one problem was solved, an undesirable one offset it, and the selective and independent control of the variables intrinsic to the overall problem was not obtainable. It is now believed that a gasket heat-insulating structure is available meeting all of the criteria dictated for satisfactory use in the carburetor assemblage, all of which is attained within economically feasible boundaries.

SUMMARY OF THE INVENTION

In an exemplary embodiment, this invention pertains to an automotive gasket-insulator structure comprising an at least two-component assembly of a first member of heat-insulative character and a second member of fluid-sealing character, wherein the first member defines peripheral portions adapted to encircle and be retained within the assemblage of use by retaining means such as bolts and the like, and wherein the density of these portions is substantially greater than the density of the remainder of either of the said members. More specifically, the invention pertains to a heat-insulative and fluid-sealing gasket structure comprising a heat-insulative member of selected thickness and configuration generally having a central opening and having a plurality of spaced bolt holes therethrough, the holes being peripherally spaced therearound. The bolt holes in one embodiment are larger than are necessary to accommodate the bolts and each has a non-metallic, generally congruent, annular insert member therein of high strength and low thermal conductivity so as to form a properly sized bolt hole. A layer of gasket material is positioned on at least one side of the heat-insulative member and generally is of the same configuration, and it may be secured to the heat-insulative member by an adhesive bond. A continuous sealing bead may be fashioned from a portion of one of the gasket layers inward of and around the central opening of the structure, and the sealing bead is of considerably less density than the remainder of the gasket layer from which it is formed, thereby lending considerable resilience and conformability to the sealing bead in order to aid and effect sealing of the carburetor assemblage in which the structure is used. The invention is also directed to specific methods of fabricating the above referred-to members.

BRIEF DESCRIPTION OF THE DRAWINGS

FIG. 1 is a schematic illustration of how the structures of this invention are used;

FIG. 2 is a perspective view of one of the embodiments of the invention as it might be applied to the FIG. 1 environment;

FIG. 3 is a fragmentary, sectional view in cross section taken along the lines 3—3 of FIG. 2;

FIG. 6 illustrates still another embodiment of the invention;

FIG. 7 is a sectional view in cross section taken along lines 7—7 of FIG. 6;

FIG. 8 is an expanded view in cross section of the components used to form the embodiment of FIG. 6;

FIG. 9 is a cross section of the embodiment of FIG. 6 together with two flanges and a bolt.

DESCRIPTION OF THE PREFERRED EMBODIMENTS

Figure 4A:
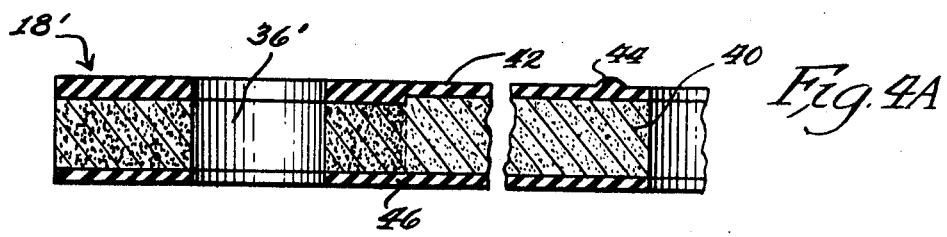
FIGS. 4A and 4B are fragmentary views in cross section illustrating various embodiments of the invention.

Referring to the drawings wherein like numerals of reference will designate like elements throughout, and referring specifically to FIG. 1, the intended field of use for the inventive structures of this invention is illustrated. It will be noted that the conventionally-found carburetor assembly 2 having the usual air filter or horn 4 is secured by a wing nut to the carburetor bowl 12, which in turn is secured by bolts 5 to the throttle body 14, the latter being secured by bolts 6 to the intake manifold, as shown at 8. This is a very diagrammatic illustration but will serve the purposes to show that the heat-insulating gasket structure 10 of this invention is positioned between the flanged portions 3 and 7 of components 2 and 8, respectively, so as to prevent heat build-up from the remainder of the engine (not shown) in the sensitive carburetion area. By the provision of the structure 10, distortion of the flanged mating areas 3 and 7 of components 2 and 8 is substantially prevented; a high degree of torque retention is maintained; and last, but not least, effective fluid-tight sealing is obtained. This latter facet is important when considering the low vaporization temperatures of fuel hydrocarbons that are normally consumed in the operation of internal combustion engines.

Referring to FIG. 2, the preferred type of heat-insulating gasket structure that may be used in the particular environment shown in FIG. 1 is depicted (although it should be understood that the structures of this invention may also be used between the sensitive throttle body 14 and carburetor bowl 12). Here, heat-insulating gasket structures 16 has an outer configuration generally conforming to the size and shape of the flanged surfaces that it will be positioned between. It will be noted that there are spaced tab, ear or bolt hole portions, such as 18, and central aperture or opening 20 forming the interior of the structure. Spaced inwardly from bolt hole portions 18 and radially from central opening 20 is sealing bead 22, the specifics of which will be hereinafter detailed.

The heat-insulating gasket structure 16 is fabricated in this particular instance of a central core member or laminate 24, here illustrated as being composed of two thicknesses 24a and 24b being secured to one another by an adhesive bond layer such as 26. Laminate 24 may comprise a single or a plurality of individual laminae and should be of low thermal conductivity. A satisfactory type of material has been found to be a phenolicresin impregnated vegetable fiberboard having on either side a congruently shaped gasket layer 28 and 30 of a suitable, conformable gasket material, the specifics of which will be detailed in the following commentary. Gasket layers 28 and 30 are adhered to elements 24a and 24b of laminate 24 by an adhesive layer, omitted for purposes of clarity but similar to layer 26 between elements 24a and 24b.

Each of the bolt hole, ear or tab portions 18 is provided with an oversized hole or aperture, such as 32, within which annular reenforcing member 34 is firmly held by friction and/or chemical bonding. Member 34 is also provided with an aperture, such as 36, which forms a sized bolt hole opening to receive retaining bolts 6 to be used in the final assemblage to maintain the flanged components of the carburetor, with the gasket 16 therebetween in firm, rigid relationship. The specifics of member 34 will be described in detail later.

The bottom gasket layer 30 is essentially planar and coextensive with the laminated core member 24, but may, if found desirable, be provided with a sealing bead similar to bead 22 located on the upper planar surface of structure 16 and also being formed of the same material as gasket layer 28. While bead 22 is formed of the same material as gasket layer 28, it is or a less dense quality so as to be compressible or conformable in the carburetor assemblage. Sealing bead 22 may take any shape, depending upon the configuration of the two mating carburetor components between which gasket structure 16 is to be used, but generally, it will be continuous in form. In some instances, a similar type bead around the apertures 32 formed in tab portions 18 may be found to be desirable. Bead size and shape will be governed by specific end uses, but generally the bead may have a height within the range of about 0.005–0.015 inch, and in the preferred form will have a rounded cross section about 0.050–0.080 inch wide. Other heights and cross-sectional configurations are, of course, contemplated.

In the FIG. 2 embodiment the insert reenforcing member 34 is shown as a solid member of synthetic, non-metalic material, but it may also be, as will immediately become apparent, a laminated structure, a metal member, or one of solid molded character. A wide range of materials, sizes and shapes will also serve desired purposes.

Figure 4B:
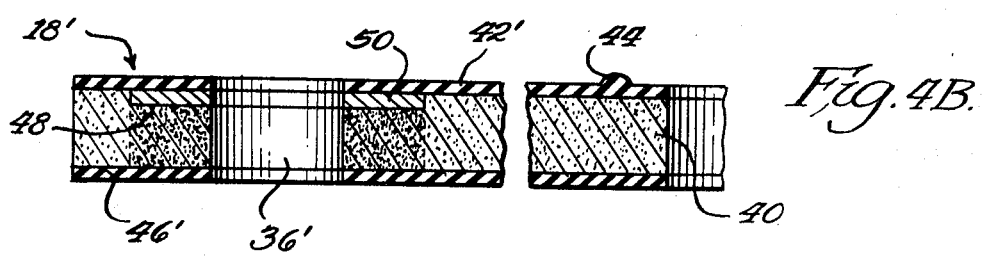

The embodiment of the invention just described is a preferred one, but there are other arrangements contemplated, and some of these are shown in FIGS. 4A and 4B. Referring specifically to these Figures, it will be noted that a heat-insulating member or core 40 is shown as fabricated of a single, unitary board, but again, it may be a laminated one as earlier described with two or more individual layers or components. For purposes of illustration, however, the central core 40 is illustrated as a single thickness comprising low thermal conductivity material such as resin-impregnated vegetable fiberboard of the type that is commercially available about 0.090 inch thick, but which is reduced, when densified, at the ear or tab portions about 0.015 inch as by coining or high pressure compression. The primary distinction in this embodiment is that bolt or tab portions 18' differ from those tab portions 18 shown in FIGS. 2 and 3. In each of the illustrations, a gasket layer is used on both top and bottom of the central core member 40, but it should be understood that only one such gasket layer with, or without sealing bead on either upper or bottom surface may be used under certain conditions.

Referring specifically now to FIG. 4A, a bolt hole tab portion 18' is shown as having a highly densified construction as indicated by the heavy cross-hatching. This extreme densification is obtained by pressing, coining, or otherwise decreasing the volume of the fiberboard 40 in the tab area 18' of the bolt hole opening. Upper gasket layer 42 is provided with a sealing bead, such as 44, of less density, and hence more conformability than the remainder of the surrounding gasket layer 42. It should be noted also that gasket layer 42 is of greater thickness in the area of the core densification and preferably has approximately the same density of the bead 44. Positioned on the bottom of core insulating board 40 is another gasket layer, such as 46, and is coextensive with the tab portion 18', and each of the gasket layers 42 and 46 may be secured to the core 40 by means of an adhesive bond layer omitted for purposes of clarity.

Referring now to FIG. 4B, a structure similar to that shown in FIG. 4A is depicted, with the exception that densification of the fiberboard core 40 in the area of the tab 18' is carried to an extent so as to form depression or recess 48 in the outermost portion of tab 18'. The gasket layers 42' and 46, as well as sealing bead 44, are the same as earlier described for the FIG. 4A embodiment, except that the gasket 42' is preferably of uniform thickness and density except for the bead 44. In order to obtain high torque retention and proper sealing when the unit is clamped between mating flanges of the carburetor assembly, an annular insert member or washer, such as 50, is fitted and press fitted or otherwise secured in recess 48. Obviously, because it is desired to cut down on heat transmission between metal components in which the structures of this invention are used, it is desirable to use a metal of low conductivity for insert 50, if a metal washer is to be used, but still preferred is a high density, highly compressed resin-impregnated asbestos fiber material or molded plastic material of low thermal conductivity.

Figure 5A:
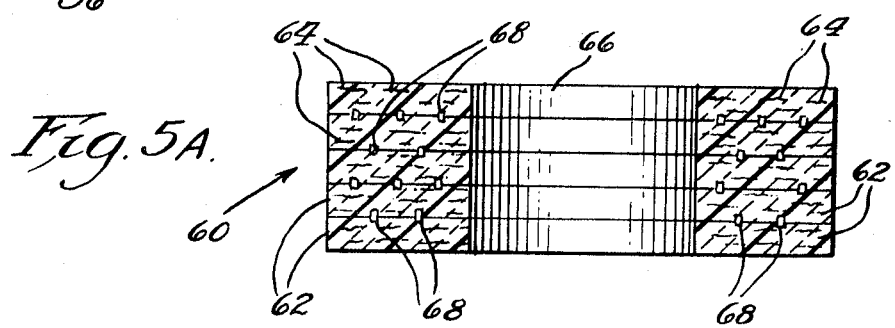
FIGS. 5A and 5B illustrate in somewhat exaggerated and simplified cross section a component of the structure depicted in FIG. 3.
Figure 5B:
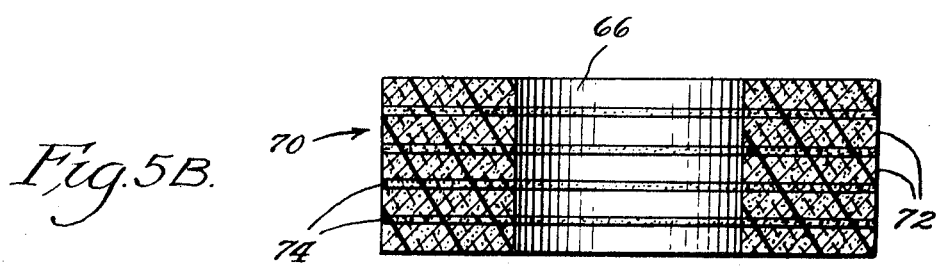

Referring now specifically to FIGS. 5A and 5B, a preferred mode of obtaining densification or high torque retention is by means of an insert of a type that may be used especially in the FIGS. 2, 3 and 4B embodiments of the invention. In FIG. 5A, the insert 60 is shown as comprising a plurality of laminae 62 of a thin, porous asbestos paper construction with long asbestos fibers 64 being laid perpendicularly to the longitudinal axis of the central aperture 66. In this particular structure, the individual lamina 62 are placed in a vertical stack and then subjected to a vacuum impregnation process, the impregnation utilizing a heat-resistant thermosetting resin such as the phenolic resins to form interconnecting links, such as 68, between the individual laminate layers 62. These links 68 are merely diagrammatically illustrated, and it is not intended to show in micro-photographic fashion the impregnated structure that would actually result after such impregnation process. Suffice it to say, however, that an annular or tubular laminate member 60 is formed having a multiplicity of interconnecting resin links, such as 68, and being totally encased by a layer of the same material on the outside and, indeed, the inside surfaces, such as shown. After the plurality of lamina 62 have been vacuum impregnated or otherwise interconnected with phenolic resin, the member 60 is highly compressed and densified to produce a member of high strength, good torque retention, and low heat or thermal conductivity.

The FIG. 5B embodiment shows another construction for an insert member 70, and such member is depicted as comprising a plurality of asbestos board lamina 72 which have been impregnated or dipped in a phenolic resin so as to saturate its pores and having adhesive phenolic resin layers 74 therebetween, and fabricated under high pressures to produce a highly compressed, densified member having similar characteristics as member 60 in FIG. 5A.

It should be understood that the products described in FIGS. 5A and 5B are suitably post-cured and are adapted for use for the insert 34 of FIG. 3 or the washer 50 of FIG. 4B.

THE CORE OR INSULATING MEMBER

Because it is highly desirable to provide suitable insulation between carburetor components as referred to herein, the thickness of the insulating member will be dictated by space requirements and structural characteristics of the carburetor as well as the temperatures developed in the carburetor area. Generally speaking, the insulator member will be one having a low heat conductivity and will have a "K" value of approximately 1.0 – 1.2, but this will vary depending upon other factors. Generally speaking, the insulating member may be made up of one or more layers or lamina depending upon space and other requirements and the form in which the insulative materials are commercially available. The materials of construction for the insulative or core member may be any of those presently regarded in the art as meeting the aforedefined requirements. Materials contemplated include the well-known synthetic materials, but because of economic factors, a resin reenforced vegetable or similar fiberboard is both practical and economical. Generally, such materials may be described as semi-porous fiberboard reenforced with thermosetting resin. In some of the illustrated specific embodiments, particularly where portions of the board are to be densified or materially compressed, compressibility of the core or insulator member becomes important. Generally speaking, the thickness that the insulator member may take will, as earlier indicated, be dictated by other considerations, but in the specific embodiments disclosed a fiberboard core of about 0.030 – 0.125 inch thick will be most practical. Because a material, such as fiberboard, reenforced with thermosetting resin, is compressible, its torque retention capability will be relatively low, somewhere on the order of 40 to 50 percent, measured at a 250° F temperature using an ASTM, F 38, Method B test for a 0.125 inch thick core; thus, the need for densification in the bolt hole portion, or the alternate use of an insert of one type or another as previously disclosed, is highly desirable. Due regard for thickness reduction where densification of the core itself is contemplated is necessary, such reduction being typically in the range of about 0.015 inch.

THE GASKET LAYERS

In general, the materials contemplated in order to perform the fluid-tight sealing function in the structures of this invention are those materials commonly used in the gasket art because these materials have proven themselves in service to be able to withstand the rigors of service conditions generally found in carburetor environments. Typical such gasket materials are those made in accord with the teachings of Kao U.S. Pat No. 2,676,099, issued Apr. 20, 1954. A satisfactory type of gasket material has been one found to be using a mineral fiber and cured nitrile rubber. Such material is available from the F. D. Farnam Co. under the trade name "Kaobestos 66015." Other gasket materials and the like may be used, as disclosed in U.S. Pat. to Farnam et al. No. 3,158,626. Other materials for other applications are also contemplated. Typical thicknesses of suitable materials will be within the range of about 0.020 inch which will be reduced or compressed to about 0.015 inch during bonding thereof to the core.

Generally speaking, however, the gasket materials should be of elastometric material so as to be easily compressible in order to achieve fluid-tight sealing under light clamp loads, and generally should be those that are rather resilient, or "bulked," that is, somewhat light in density so as to be capable of being compressed to form. Where desired, a sealing bead of sufficient size may be provided to contribute to the sealing function. Also, because it is desired to fashion a structure which will provide fluid sealing, the gasket layer or layers should be conformable enough to take up the differences in mating tolerances generally found in carburetor components, and also be of a material which has low heat transmissibility.

A sealing bead, in order to effect efficient fluid-tight sealing, may be formed during the sandwiching or molding process of the insulating gasket structures of this invention. The bead may be formed on one or both gasket layers, although it has been found that the utilization of a sealing bead on the upper gasket layer will normally suffice. This bead may take many configurations, but generally, one having a rounded cross-sectional shape of a height of about 0.005 – 0.015 inch and a cross section width of about 0.050 – 0.080 inch has been found to be satisfactory. When the bead is formed of the same material as the gasket layer adjacent thereto, the density thereof will be much less than that of the surrounding gasket material for the reason that it is not compressed as much during the molding or pressing process as the gasket material layer adjacent thereto. This, then, provides a conformable or resilient protuberance or projection in order to permit satisfactory sealing.

An adhesive bond layer is contemplated for securing both upper and, where used, bottom gasket layer to the core or insulating member, and types of adhesives and the like that may be used may vary considerably just so long as they are capable of forming an effective bond and will not deteriorate under the service conditions contemplated for the structures of this invention. Generally, the neoprenes have been found to be capable of forming effective bonds, and the addition of phenolic resins to some of these formulations has also been found to be effective. A preferred type of adhesive is a phenolic resin and neoprene combination which is thermosetting at a temperature of about 325° – 350° F. It is preferred that the adhesive layer bond between the insulating member and gasket layer or layers be only that thickness necessary to form an effective bond and no more. Where applied, the bonding material layer should not exceed approximately 0.0003 – 0.0007 inch at any one layer. These same types of materials may also be used to form the adhesive bond between individual lamina of the core or insulating member where it is desired to build up and have a core insulator of a thickness greater than can be made from commercially available stocks.

There are a number of elastomer-resin compositions available, each of which has specific advantages. It is only important that the adhesive be capable of being applied as a continuous thin layer and that it be such that it can be dried or partially cured for easy handling prior to the final assemblage of the structures of this invention, and that it also be capable upon final or ultimate curing or producing a bond between adjacent lamina of the core member or between the core member and one or more gasket layers that will withstand the environmental conditions found in a carburetor assemblage. The types of elastomer compositions found desirable may be those disclosed in Farnam et al. U.S. Pat. No. 3,158,626.

AREA DENSIFICATION

As briefly alluded to hereinbefore, in order to maximize the attributes of the structures of this invention, and to have high torque retention, several means are available for achieving the desired end results. One such way has been previously mentioned, i.e., area densification of the insulator member itself at the area of the bolt holes, as shown in FIG. 4A. Another means of achieving substantially the same results is by densifying this area to the extent that a recess is formed within which an annular or tubular insert mamber may be positioned (See FIG. 4B) with or without a gasket layer covering, and the member may be of metal, solid molded plastic, or fabricated from phenolic resin-impregnated laminations of asbestos paper, asbestos board and similar such materials. Also the members, inserts or the like, when made of metal may be very similar to bushings, washers, and similar such structures, and will be fabricated of steel and similar such metals or preferably low heat conductivity or "K" value. Any of the insert members may run half the thickness, three-quarters or the thickness, or greater than the entire thickness of the finished insulator-gasket structure which generally will be about 0.115 - 0.120 inch in thickness. In the preferred embodiment, an insert member of asbestos lamina is placed in an oversized bolt hole and retained therein in friction-fit manner and extends about the entire thickness of the finished structure, but in the fabricating process it is of slightly less thickness, say about 0.005 inch, to thereby act as a limiting compression factor in the gasket-insulator structure itself. For instance, because the materials of construction are compressible in nature and an insert member either of metal or highly densified asbestos phenolic resin-impregnated asbestos is substantially unyielding in comparison, the insertion of such a member prior to the actual volume reduction, compression or molding of the overall structure will limit the extent to which the overall structure may be compressed. More specific details of this aspect will be delved into under manufacturing techniques.

In the preferred embodiment, however, where a separate non-metallic insert is utilized, the insert comprises a plurality of layers of asbestos paper or asbestos millboard which has been saturated or impregnated with a thermosetting phenolic resin. Preferably, the number of laminations is kept to a minimum, but this will generally be dictated by the thickness or height of the insert that will be used in the particular insulator-gasket structure. The heat-resistant thermosetting, phenolic resin provides the necessary strength and torque retention, and in a preferred form, the fibers (where asbestos paper or asbestos fiberboard is used) have relatively long lengths and are laid at right angles to the clamping force, or, in other words, are normal to the longitudinal axis of the bolt hole which the insert, itself, forms. Other non-metallic fibers will also perform satisfactorily. When a lamination has been built up, it will be subjected to a pressing operation which will materially reduce the thickness to as great as 40 and more of its original thickness, thereby producing a highly compressed and dense non-metallic insert which may be subjected to a curing step to insure total curing of the phenolic resin or other material used in fabricating the insert. Non-metallic inserts using asbestos fiber and the phenolic resin combination will normally have a density of approximately 120 pounds per cubic foot, a thermal conductivity or "K" factor of approximately 2 to 2.5, or thereabouts (as compared to about 50 for steel), and will have high compression strength and also chemical resistance to the environment in which the insulator-gasket structure will be used. Also, they will preferably be able to take a torque load of approximately 15,000 to 20,000 pounds per square inch without fracture.

FABRICATION TECHNIQUES

Keeping in mind the materials used in the insulator-gasket of this invention, a more comprehensive understanding of the exemplary methods of fabricating the overall structures may now be had, taken in conjunction with earlier alluded to manufacturing techniques.

In the following example, it will be assumed that a structure having a double lamina core with top and bottom gasket material layers is desired. Suitable cover stock, generally of a slightly bulkier nature than is usual (especially where a sealing bead is to be formed), is cut to an appropriate width, this width being dictated by the width of the core or head-insulating member. In some instances, however, even the commercially available resin-impregnated fiberboard will have to be cut to size, and thus the size will be dictated by the configuration of the ultimate insulator-gasket structure to be formed. After appropriate sizing of, for instance, a gasket layer and the heat-insulating member board, a first laminate is formed by taking a continuous roll of cover stock, and laminating it with an adhesive bond material to a sheet of core material approximately 90 inches long and one-half the final core thickness, with periodic cutting off from the continuous roll of cover stock to form a plurality of gasket covered core sheets. Thereafter, the panels will be coated on the side opposite the cover stock with a thin coating of elastomer-resin adhesive and then allowed to dry. After suitable drying, the thusly gasket-layered panels may be laminated to one another to form a second laminate by means of the adhesive layer and cut into appropriate widths.

The second or final laminate may then be die-cut into the ultimate structure configuration that is intended with oversized bolt hole openings which will later receive non-metallic inserts in order to form properly sized bolt hole openings. Depending upon the total thickness of the insulator-gasket structure, it may be made from two layers of core board, or one layer of core board, or more than two layers. If there are more than two layers, the inner layers of the core board will also be coated on either side with a thin layer of adhesive as just described.

The thickness range of the bonding material requires some control so that it will not exceed approximately 0.0003 - 0.0007 inch at any one layer. Double this thickness would occur where tow coated surfaces are brought together.

Next, the sandwich or assemblage is subjected to a hot pressing operation in a pin mold, the upper mold being provided with a groove to ultimately fashion the sealing bead in the upper gasket cover stock. Before initiation of the hot pressing operation, however, the preferred method is to insert the non-metallic bushings or inserts which will act as a sizing means for the overall thickness of the final structure, since they are relatively non-compressible in relation to the remainder of the structure. This permits the production of structures of this invention to very close thickness tolerances. Obviously, where warranted, these inserts may be placed in position after the hot-pressing operation. During the hot-pressing operation, the sandwich of members in considerably reduced in thickness, and hence, the inserts may be slightly less in height than the intended overall thickness of the ultimate structure (as indicated at 70 in FIG 3) to thereby insure a properly sized insulator-gasket member. The bead is best formed by means of a groove in the upper mold half, and by bulking both the cover stock and the core slightly (within the range of 5 - 10 percent), and then bringing the assemblage to full density during the pressing operation, which procedure produces a conformable bead and which provides for ease of forming the bead. Obviously, where it is contemplated that the insulating member, itself, be densified in the area of the bolt holes, this is accomplished by building up those portions, and thereafter densifying to a much greater extent than would be the case where the member itself was not be be densified. The formation of a recess with partial densification and insertion of a metallic or non-metallic partial insert may, of course, be accomplished at the same pressing step, as will be apparent from the drawings. Suffice it to say, however, that the insertion of insert elements, where contemplated, may be subsequent to the entire pressing step, or it may be before or at the time of the mold pressing operation. The hot pressing is carried out over a dwell time, depending upon the thickness in the area of the bond line, at a temperature sufficient to cure, set, or otherwise insure bonding of all of the members making up the structure. Obviously, where an epoxy resin-type bonding material or adhesive is contemplated, it may not be necessary to hot-press or to carry on curing at an elevated temperature, since such systems normally involve a curing agent or catalyst not requiring heat, pressure, etc.

Thereafter, the insulator-gasket structure may be subjected to a post-cure, if required, and the insert member 34 may then be pressed into position, if not already there. This positioning may be done by hand, semi-automatically, etc., and these as well as other modifications, depending upon the structures involved, will be at once make themselves apparent when considering the materials employed and the desired results to be achieved.

In an alternate procedure, the non-metallic washers are made from asbestos millboard having long asbestos fibers bound together with starch or other conventional binder, and the millboard is impregnated with phenolic resin, preferably with the aid of vacuum so that the resin content is from 10 to 30 percent by weight of the board, and ordinarily within 20 to 25 percent of such weight. The resin used is a water-alcohol phenolic resin mix. After the board is vacuum-impregnated with the phenolic resin, it is dried at a low temperature and stored in a cool room (approximately 30 – 50° F) to substantially stop resin air curing.

The washers are then die-cut from the board and dropped into the opening in the gasket and placed in a pin mold, with the plunger which operates in the area of the pin being offset to accommodate the greater thickness of the washers. The pin mold is then closed under pressure, but not too quickly, because it has been found that a certain amount of time is required to permit the resin to flow laterally into the adjacent gasket structure and be bonded thereto at temperatures of about 150° to 350° F. Ordinarily, the time required for this function to take place is on the order of 5 to 10 seconds.

After the washers are set in the gaskets, the bond lines between the laminates forming the core and between the gasket covers and the core are cured at a temperature of approximately 275°F for 10 or 15 minutes in order to degas the material, after which the temperature is stepped up to 300° to 375° in order to get the complete cure.

Of course, the non-metallic washers, instead of being compressed and densified in the manner described above during the hot-pressing of the entire gasket, may be completely fabricated and cured before the washers are inserted in the insulator gasket, relying upon a press fit to maintain the washer in place within the gasket.

A modified form of the invention is shown in FIGS. 6 through 9 inclusive, and in this embodiment of the invention the core, generally designated 85, is made from asbestos millboard and is essentially the same as the asbestos millboard used in the fabrication of the inserts 34 previously described. In this case, the core 85 is formed by taking two or more die-cut pieces 86 which have been suitably impregnated with the water-alcohol, phenolic resin mix, and placing them on a heated pin mold with a washer-like member 87 interposed therebetween (see FIG. 8), and flanked on their outer sides with die-cut gasket pieces 88 and 89. The core members 86 have openings 90 corresponding in diameter to the O.D. of the bolts that will be used for clamping the mating metal flanges together, and the washer member 87, which is also made of asbestos millboard and impregnated with the phenolic resin mix, has an interior opening 91 which also corresponds in diameter to that of the clamping bolts. The outer diameter of the washer 87 is roughly the same as that used for the inserts 34 in the embodiments of the invention shown in FIGS. 2 and 3, and the gasket material 88 and 89 may be the same as the gasket stock shown at 28 and 30 in FIGS. 2 and 3. The gaskets 88 and 89 are die-cut with openings 92 which are approximately the same diameter as the O.D. of the washers 87, so that when the gasket components are hot-pressed in the pin mold to form the finished gasket, the core 85 will be of substantially homogeneous character with protuberances 93 and 94 projecting through the openings 92 in the gasket stock, and with the density of the core being substantially that of the inserts 34. After the hot-press formation of the composite gasket, it may be taken through final cure.

It will, of course, be understood that the core 85 and the gasket covers 88 and 89 are die-cut with the other openings that are necessary to form the configuration shown in FIG. 6 of the drawings.

Either or both of the gasket covers 88 and 89 have a continuous bead 95 formed on their outer faces during the compression of the mold, this being accomplished by grooves in the mold faces, as previously described. Also, in some instances it is desirable to form a number of small protuberances or buttons 96 adjacent to the edges of the gasket for a purpose that will be later described, these buttons being formed during the compression of the mold in the same manner that the bead 95 is formed.

The fundamental objective in forming a heat insulating gasket in the manner just described is so that when the mating flanges 3 and 7 are clamped together by the bolts 6, as shown in FIGS. 1 and 9, the flanged areas 3 and 7 will bottom on the protuberances 93 and 94, respectively, thereby providing firm clamping together of the parts and high torque retention, with the bead 95 on one or both sides of the gasket providing the required sealing of the opening 97 from the atmosphere, and with an air space 98 formed between the metal flanges and the gasket structure. The buttons 96, when used, help to maintain that air space when the distance between the bolts and the character of the flanged areas are such that distortion could bottom the flanged areas on the main portion of the gasket structure. It has been found in tests that the heat transmission with a gasket of this type is substantially lessened when the mating faces 3 and 7 are not permitted to have face-to-face contact with the gasket coverings of the composite gasket, and that providing any type of air space, on the order of .010 of an inch or less, the insulating qualities of the composite gasket are substantially enhanced.

Although it is preferred to actually maintain an air space, such as 98, between the flanges and the composite gasket, some advantage is gained even when there is some face-to-face contact, as long as such face-to-face contact is not a truly pressure contact. It is for that reason that in this embodiment of the invention the outer faces of the cover stock 28 and 30 should be level with the outer faces of the protuberances 93 and 94, or below these protuberances, as distinguished from the embodiment of the invention shown in FIGS. 2 and 3 where it is intended that the cover stock should be slightly compressed during the clamping of the parts together by the bolts.

Merely by way of specific illustration, and not by way of limitation, it has been found satisfactory to have the air space 98 on the order of from about 0.005 to 0.010 inch, with the free height of the sealing bead being from about 0.005 inch to about 0.007 inch greater than the designed air space, with the bead being compressed during the clamping action sufficiently to have the mating flanges 3 and 7 bottom on the protuberances 93 and 94 and provide the desired air space 98. The buttons 96, when used, might have a normal free height of approximately 0.002 inch to 0.004 inch less than the height of the bead, and would be slightly compressed during the clamping action to assure the desired air space.

The bead 95 is formed in the same manner as the bead 22 of FIGS. 2 and 3, and has lesser density than the main body of the cover stock when the gasket is formed, as previously described.

For some installations, it may be desirable to use in place of the buttons 96 a continuous bead running around the peripheral margin of the composite gasket and being located perhaps ⅛ inch inwardly of the peripheral margin. This bead would be formed in the same manner as the bead 95, but would have a height corresponding to that prescribed for the buttons 96 and would serve, not only as a limiting abutment to assure the air space remote from the clamping bolts, but also to seal the exposed faces of the gasket material from the elements and preserve the life of the gasket.

It should be understood that although it is preferred to have the core 85 made of asbestos millboard in the manner that has just been described, it is also possible to use the core structure disclosed in the FIGS. 2 and 3 embodiment of the invention, with the inserts 34 being sized so that they are either flush with the covers 28 and 30 or slightly above their level in order to obtain the desired improvement in heat insulating properties. When the inserts 34 are above the level of the cover stock, or when the protuberances 93 and 94 are above such level, the need for the buttons 96 is lessened, and in most instances eliminated.

These modifications as well as other embodiments and interchangeables will make themselves apparent to those working in this art, and such matters will not detract from the essence of the herein disclosed invention is measured by the appended claims.

The embodiments in which an exclusive property or privilege is claimed are defined as follows:

1. In a heat insulative gasket having a fluid passage-way therethrough and a bolt hole, said gasket comprising a body portion and a bolt hole portion, said bolt hole portion defining an area around the bolt hole of relatively high density, substantially non-compressible, material with a k factor in said bolt hole portion of about 3 or less, said body portion having at least portions thereof of relatively low density, compressible gasket material completely surrounding said fluid passageway and lying in a plane above that of said bolt hole portion.

2. A heat insulative gasket as set forth in claim 1, in which said body portion comprises a core and a gasket layer adhered thereto with said gasket layer having an integral portion thereof constituting said relatively low density compressible material surrounding the fluid passageway.

3. A heat insulative gasket as set forth in claim 2 in which said integral elevated portion is in the form of a bead.

4. A heat insulative gasket as set forth in claim 1, in which the densified bolt hole portion is in the form of a bushing which includes a thermosetting resin.

5. A heat insulative gasket as set forth in claim 4, in which the bushing includes asbestos fiber reinforcement for the thermosetting resin.

6. A heat insulative gasket as set forth in claim 4, in which the busing is firmly mounted in a circular opening formed in the gasket.

7. A heat-insulative and fluid-sealing gasket structure comprising a heat-insulative member of selected thickness and configuration having a fluid opening and a plurality of spaced bolt holes therethrough, said bolt holes being larger than necessary to receive bolts and each having a non-metallic generally congruent annular insert member therein of high compressive strength and low thermal conductivity to form a sized bolt hole, and a layer of gasket material on each side of said heat-insulative member and having the same general configuration thereof and being secured to said member by an adhesive bond, and a continuous sealing bead on at least one of said gasket layers spaced from and surrounding said fluid opening with the top of the bead lying above the plane of the insert member.

8. A gasket structure in accordance with claim 7 wherein said heat-insulative member is of sufficient thickness to inhibit heat transmission between metal components in which it is used.

9. A gasket structure in accordance with claim 8 wherein said heat-insulative member is of thermosetting resin-impregnated fiberboard.

10. A gasket structure in accordance with claim 8 wherein said annular insert members are of less or substantially equal thickness with respect to the total sealing thickness of said gasket structure.

11. A gasket structure in accordance with claim 10 wherein said annular insert member comprises a plurality of laminations of resin-impregnated asbestos paper.

12. A gasket structure in accordance with claim 11 wherein said asbestos paper comprises long fibers of asbestos laid at right angles to said bolt openings.

13. A gasket structure in accordance with claim 12 wherein said resin is cured phenolic resin.

14. A gasket structure in accordance with claim 8 wherein said sealing bead is formed by a portion of said gasket layer having a density less than the remainder thereof.

15. A gasket structure in accordance with claim 14 wherein said sealing bead is substantially semi-circular in cross section and is of sufficient size to effectuate substantially fluid-tight sealing when said structure is clamped and used in its intended environment.

16. A gasket structure in accordance with claim 15 wherein a second gasket layer is provided on the opposite side of said heat-insulative member opposite said sealing bead.

17 A heat insulator gasket for carburetors used in automotive engines and the like comprising a core member of fiberboard material, and gasket cover stock comprising elastomeric material bonded to the top and bottom faces of the core, said core and cover stock having a plurality of aligned openings therethrough for the reception of bolts, said bolt holes having the area immediately adjacent thereto characterized by having a density substantially greater than the density of the remainder of the gasket, at least one of said cover stock coverings having an elevated continuous bead lying in a plane above that of the densified bolt hole areas and located on and above said remainder of the gasket.

18. A gasket as set forth in claim 17 in which the densification in the area of the bolt holes comprises a non-metallic, highly densified, resin-impregnated and cured material having a heat-insulating factor less than about 3.

19. A heat insulator gasket for carburetors and the like comprising a core member carrying gasket members on the top and bottom surfaces thereof, and with bolt holes and a fluid port extending through the composite gasket, said gasket being characterized in that the gasket in the area of the bolt holes has a $k$ factor less than about 3; the thickness of the gasket in such areas is greater than the thickness of the adjacent area of the gasket; a sealing bead is formed on one or both of the gasket members in the area of and surrounding said fluid port; and wherein the overall thickness of the gasket in the area of said sealing bead is slightly greater than that of the gasket at said bolt hole areas, whereby when the gasket is clamped between flanged members, an air space is provided between one of the flanged members and the adjacent gasket member.

20. A gasket as set forth in claim 19 in which the core member is a cured, resin-impregnated, asbestos fiberboard.

21. A gasket as set forth in claim 19 in which the air space is approximately 0.005 inch to 0.010 inch in depth.

22. A gasket as set forth in claim 19 in which a sealing bead be provided on both the top nd bottom gasket members.

23. A gasket as set forth in claim 19 in which the free height of the sealing bead is selected to provide about 0.005 inch to about 0.007 inch compression when the flanged members are clamped together.

24. A gasket as set forth in claim 19 in which an additional protuberance is provided on one or both gasket members adjacent to the peripheral margin of the gasket.

* * * * *

UNITED STATES PATENT OFFICE
CERTIFICATE OF CORRECTION

Patent No. 3,655,210          Dated April 11, 1972

Inventor(s) Robert G. Farnam and Michael T. Passarella

It is certified that error appears in the above-identified patent and that said Letters Patent are hereby corrected as shown below:

In the Abstract, line 15, for "band" read -- bead --;

Column 1, line 4, before the period, insert -- now abandoned --
Column 4, line 28, between "gasket" and "42'" insert -- layer --;
Column 11, delete lines 1 and 2, and read instead -- WE CLAIM: --;
Column 11, line 26, for "busing" read -- bushing --;
Column 12, line 12, for "a second" read -- the other --;
Column 12, line 15, after "core" delete "member";
Column 12, line 19, after "therethrough" insert -- defining bolt holes --;
Column 12, line 50, before "provided" for "be" read -- is --;
Column 12, line 50, between "top" and "bottom" for "nd" read -- and --.

Signed and sealed this 14th day of November 1972.

(SEAL)
Attest:

EDWARD M. FLETCHER, JR.
Attesting Officer

ROBERT GOTTSCHALK
Commissioner of Patents